United States Patent
Anderson

(10) Patent No.: US 8,701,842 B2
(45) Date of Patent: Apr. 22, 2014

(54) TRAILER BREAKAWAY SWITCH CABLE

(75) Inventor: Jed Anderson, Lindon, UT (US)

(73) Assignee: Progress Mfg. Inc., Provo, UT (US)

( * ) Notice: Subject to any disclaimer, the term of this patent is extended or adjusted under 35 U.S.C. 154(b) by 617 days.

(21) Appl. No.: 12/868,718

(22) Filed: Aug. 25, 2010

(65) Prior Publication Data

US 2010/0320040 A1    Dec. 23, 2010

Related U.S. Application Data

(63) Continuation-in-part of application No. 12/839,385, filed on Jul. 19, 2010, now abandoned, which is a continuation-in-part of application No. 12/698,098, filed on Feb. 1, 2010, now abandoned.

(60) Provisional application No. 61/157,057, filed on Mar. 3, 2009, provisional application No. 61/148,854, filed on Jan. 30, 2009.

(51) Int. Cl.
*B60T 13/08*    (2006.01)

(52) U.S. Cl.
USPC ........................ 188/112 R; 280/432; 280/457

(58) Field of Classification Search
USPC ........ 280/457, 480.1; 188/3 H, 112 A, 112 R
See application file for complete search history.

(56) References Cited

U.S. PATENT DOCUMENTS

| | | | | |
|---|---|---|---|---|
| 2,236,247 A | * | 3/1941 | Kolb | ................................ 303/18 |
| 3,153,832 A | | 10/1964 | Shumway | |
| 3,212,792 A | * | 10/1965 | Reustle | .......................... 280/432 |
| 3,570,633 A | * | 3/1971 | Garnett | ...................... 188/112 R |
| 3,691,330 A | | 9/1972 | Hollander | |
| 3,881,577 A | * | 5/1975 | Wherry et al. | ............. 188/112 R |
| 3,989,269 A | | 11/1976 | Rendessy | |
| 4,052,695 A | | 10/1977 | Myers | |
| 4,223,766 A | * | 9/1980 | Huetsch et al. | ............ 188/112 R |
| 4,239,252 A | | 12/1980 | Huetsch et al. | |
| 5,013,059 A | | 5/1991 | Goettker | |
| 5,039,272 A | | 8/1991 | Holmes et al. | |
| 5,195,768 A | * | 3/1993 | Hendrix | ......................... 280/428 |
| 5,362,084 A | | 11/1994 | Edwards | |
| 5,415,424 A | * | 5/1995 | Dolan | ............................ 280/432 |
| 5,492,204 A | | 2/1996 | Wallace | |
| 5,678,664 A | | 10/1997 | Marasco | |
| 5,911,483 A | | 6/1999 | Overhulser | |
| 6,035,977 A | | 3/2000 | Marasco | |
| 6,644,761 B2 | | 11/2003 | Schuck | |
| 6,848,546 B2 | | 2/2005 | Roll et al. | |
| 6,971,661 B1 | * | 12/2005 | MacKarvich | .................. 280/457 |
| 7,143,874 B2 | | 12/2006 | Roll et al. | |
| 2002/0030405 A1 | | 3/2002 | Harner et al. | |

FOREIGN PATENT DOCUMENTS

| | | |
|---|---|---|
| CA | 2112714 | 1/1998 |
| GB | 2305985 | 4/1997 |

* cited by examiner

*Primary Examiner* — Christopher Schwartz

(74) *Attorney, Agent, or Firm* — Clayton, Howarth & Cannon, P.C.

(57) ABSTRACT

The present invention relates generally to trailer and towing safety devices, and more particularly, but not necessarily entirely, to trailer automatic braking devices that initiate braking when a trailer becomes separated from its tow vehicle.

18 Claims, 20 Drawing Sheets

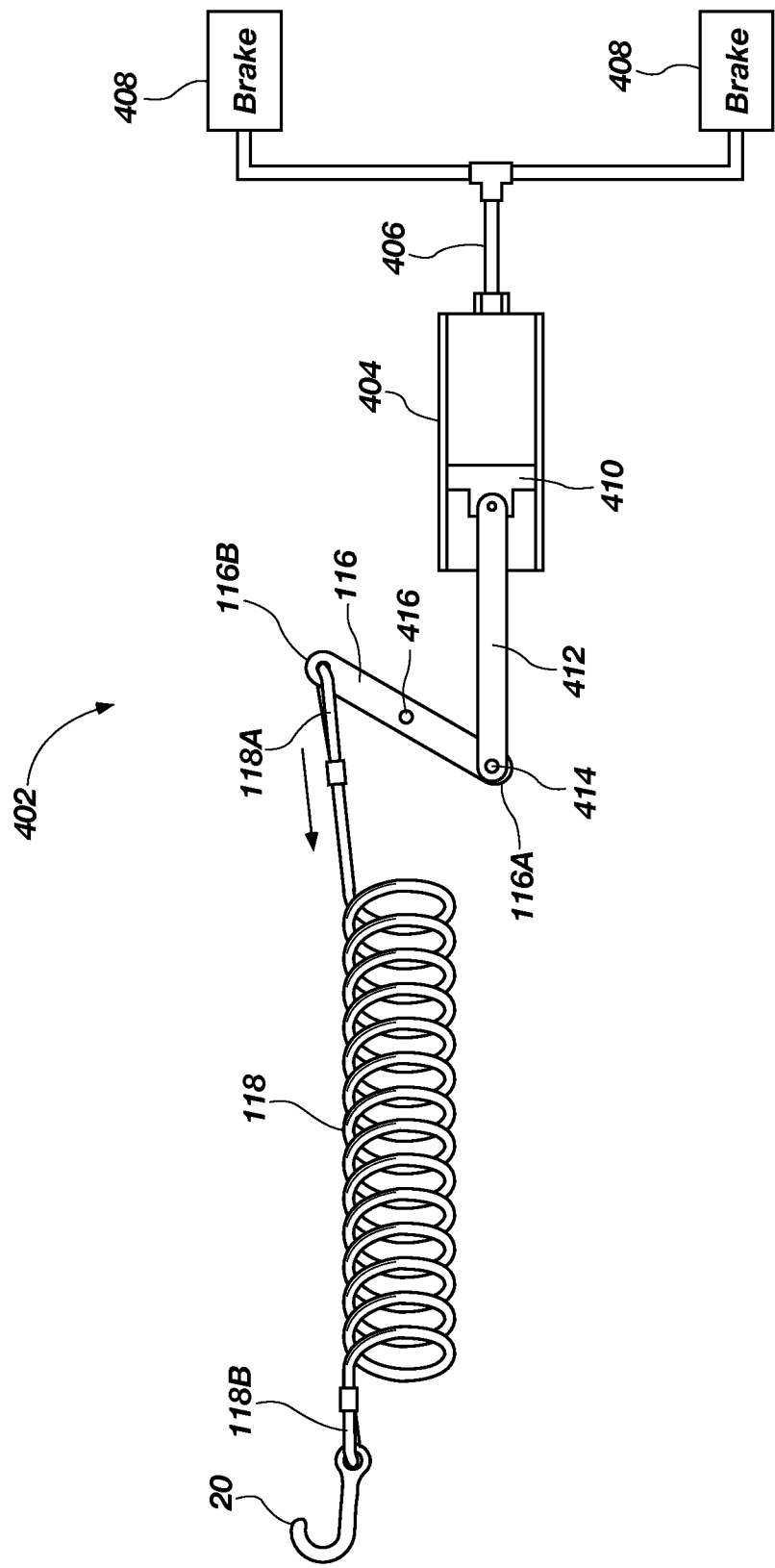

US 8,701,842 B2

TRAILER BREAKAWAY SWITCH CABLE

CROSS-REFERENCE TO RELATED APPLICATIONS

This application is a continuation-in-part of U.S. patent application Ser. No. 12/839,385, filed Jul. 19, 2010, which is a continuation-in-part of U.S. patent application Ser. No. 12/698,098, filed Feb. 1, 2010, which claims the benefit of U.S. Provisional Patent Application No. 61/157,057, filed Mar. 3, 2009, and claims the benefit of U.S. Provisional Patent Application No. 61/148,854, filed Jan. 30, 2009, which are hereby incorporated by reference herein in their entireties, including but not limited to those portions that specifically appear hereinafter, the incorporation by reference being made with the following exception: In the event that any portion of the above-referenced applications are inconsistent with this application, this application supercedes said above-referenced applications.

STATEMENT REGARDING FEDERALLY SPONSORED RESEARCH OR DEVELOPMENT

Not Applicable

BACKGROUND OF THE INVENTION

1. The Field of the Invention

The present invention relates generally to trailer and towing safety devices, and more particularly, but not necessarily entirely, to trailer automatic braking devices that initiate braking when a trailer becomes separated from its tow vehicle.

2. Description of Related Art

The two most common trailer brake systems are electrical and hydraulic both have safety brake actuator systems to apply the brakes in a case where the trailer becomes separated from the tow vehicle. The electrical style breakaway system is made up of a power connection box attached to the trailer frame. This power connection box is typically equipped with electrical contacts separated by a non-conductive pull pin. This pull pin is removable and connected to a cable (typically 4-6 feet long). One end of this cable is attached to the pull pin while the other end is to be attached to the tow vehicle. In case the tow vehicle and trailer become separated while moving, the cable attached to the tow vehicle will pull the non-conductive pull pin out of the power connection box allowing the electrical contacts to contact each other, thus sending an electrical charge to the trailer brakes. The desired effect is that the trailer brakes stop the now detached trailer before it damages itself or another object.

A switch box (would be mounted to the trailer frame) cable is attached to pull pin/plunger that is removable from a switch box. A loop on the other end of cable is to be attached to the tow vehicle. A switch box and connective cable is used with bumper pull style trailers and is also used with Gooseneck and fifth wheel style trailers.

The hydraulic breakaway system is part of the hydraulic brake system which is typically integrated into the trailer coupler or forward frame section of a trailer equipped with hydraulic wheel/axle brakes. This brake actuator has a safety lever protruding from the actuator and generally in a rearward facing orientation. Attached to this lever is a cable or chain (typically 3-6 feet long). The free end of the cable is attached to the tow vehicle. In a situation where the tow vehicle and trailer become separated while moving, the tow vehicle will pull away from the trailer thus pulling the protruding safety brake activation lever into a forward orientation-which causes the inner portion of the safety lever to compress the master cylinder which compresses the hydraulic brake fluid and sends compressed brake fluid to the trailer brakes. The desired effect is that the trailer brakes stop the now detached trailer before it damages itself or another object.

A surge brake style coupler for straight tongue trailers with emergency breakaway actuator levers protruding from the top also use a similar system. One end of cable is attached to the lever and the other has a hook or loop to attach to the tow vehicle. Like the above systems, this brake actuator has a safety lever protruding from the actuator and generally in a rearward facing orientation. Attached to this lever is a cable or chain (typically 3-6 feet long). The free end of the cable is attached to the tow vehicle. In a situation where the tow vehicle and trailer become separated while moving the tow vehicle will pull away from the trailer thus pulling the protruding safety lever into an activated orientation-which causes the inner portion of the safety lever to activate the surge mechanism. The desired effect is that the trailer brakes stop the now detached trailer before it damages itself or another object.

FIG. 1 is illustrative of a trailer 10 to tow vehicle 12 union. Typically, a trailer 10 is attached for towing to a tow vehicle 12 through union assembly 14.

FIG. 2 is illustrative of a trailer 10 to tow vehicle 12 connection that has become disassociated because the union assembly 14 as come apart as shown by the bracket.

FIG. 3 is illustrative of a chain 18 used in a breakaway switching mechanism wherein the trailer 10 is connected to the tow vehicle 12. The switching mechanism comprises a switch 16, a pin 17, a chain 18 and a tow vehicle attachment 20.

FIG. 4 is illustrative of a chain 18 used in a breakaway switching mechanism wherein the trailer 10 is disconnected from the tow vehicle 12 and the chain 18 has been pulled taught.

FIG. 5 is illustrative of a chain 18 used in a breakaway switching mechanism wherein the trailer 10 is disconnected from the tow vehicle 12 and the chain has pulled the pin 17 from the safety switch 16;

FIG. 6 is illustrative of a cable 28 used in a breakaway switching mechanism wherein the trailer 10 is connected to the tow vehicle 12 and the cable 28 drags on the ground. The portion of the cable that drags is denoted by bracket D.

Despite the advantages of known safety systems and apparatus, improvements are still being sought. For example, many of the current devices require extra user effort to address problems of dragging cables and chains. For many years the safety braking systems on trailers have been equipped with cable typically 3-6 feet long or occasionally small chain. There must be slack in this cable to allow articulating movement between the tow vehicle and trailer without actuating/locking up the trailer brakes in a normal towing situation. The problem with this design is that the safety cable often hangs down near the road surface and in a turn or when going over bumps or rough terrain the cable comes into contact with the road while the vehicles are moving. This contact frays the cable, often to the point that the cable completely separates into two pieces. A cable that is in two pieces or frayed to near separation and weakened cannot perform its intended safety function of actuating the brakes. Further, it is a safety hazard to the operator as the fragmented cable wires often gouge into the hand while trying to hook up the system.

The solution up to this time has been to sell the trailer user a replacement cable or completely new electrical switch systems. Little effort has been made to protect the cable from dragging in the first place. While this problem of the cable dragging is specific to bumper pull trailers, the same electrical actuator is used on gooseneck and fifth wheel style trailers. In these type of trailers the cable doesn't risk dragging on the ground as the cable attaches in the bed of the truck, they do however risk being caught on cargo or the hitch mechanism, potentially locking up the trailer brakes while in a normal, coupled, towing situation.

The prior art is thus characterized by several disadvantages that are addressed by the present invention. The present invention minimizes, and in some aspects eliminates, the above-mentioned failures, and other problems, by utilizing the methods and structural features described herein.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 10B is illustrative of a hydraulic trailer braking system assembly pursuant to an embodiment of the present disclosure;

DETAILED DESCRIPTION

Figure 1:
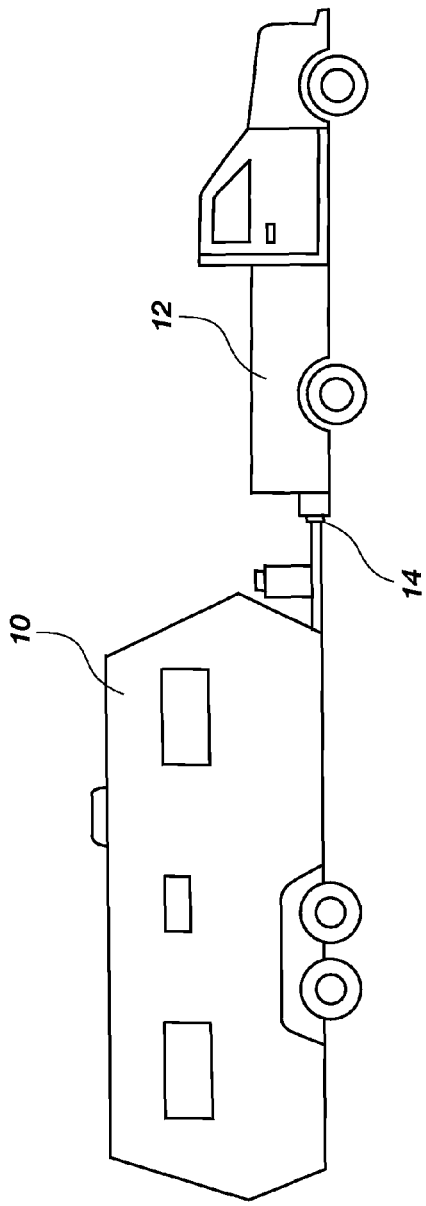
FIG. 1 is illustrative of a trailer to tow vehicle union.
Figure 2:
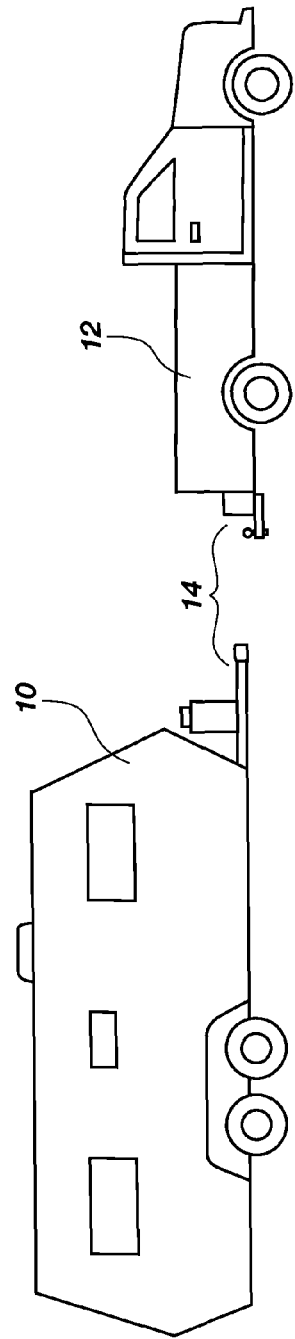
FIG. 2 is illustrative of a trailer to tow vehicle connection that has become disassociated.
Figure 3:
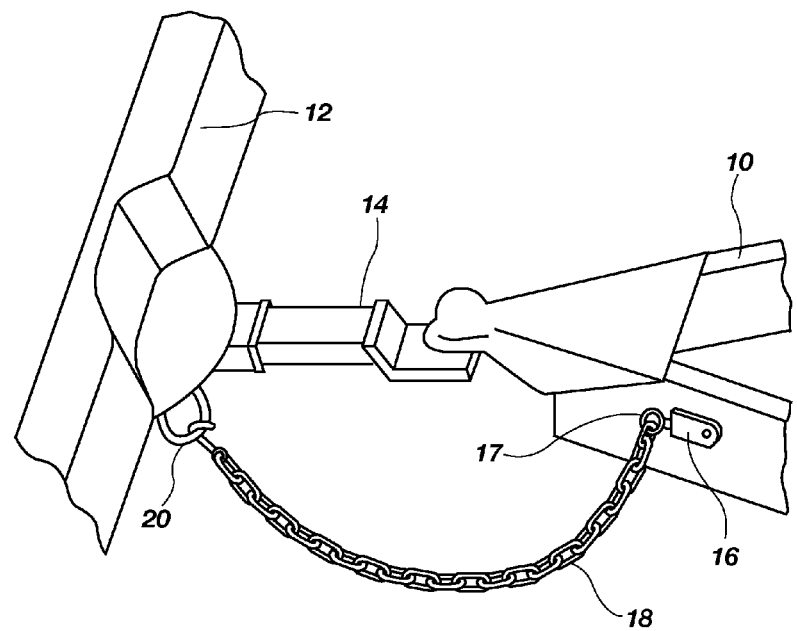
FIG. 3 is illustrative of a chain used in a breakaway switching mechanism wherein the trailer is connected to the tow vehicle.
Figure 4:
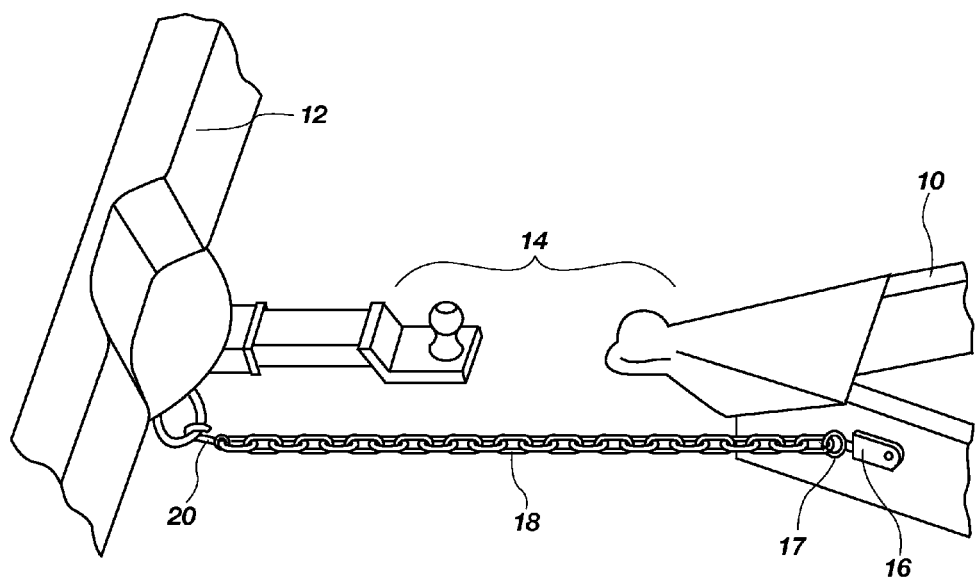
FIG. 4 is illustrative of a chain used in a breakaway switching mechanism wherein the trailer is disconnected from the tow vehicle and the chain has been pulled taught.
Figure 5:
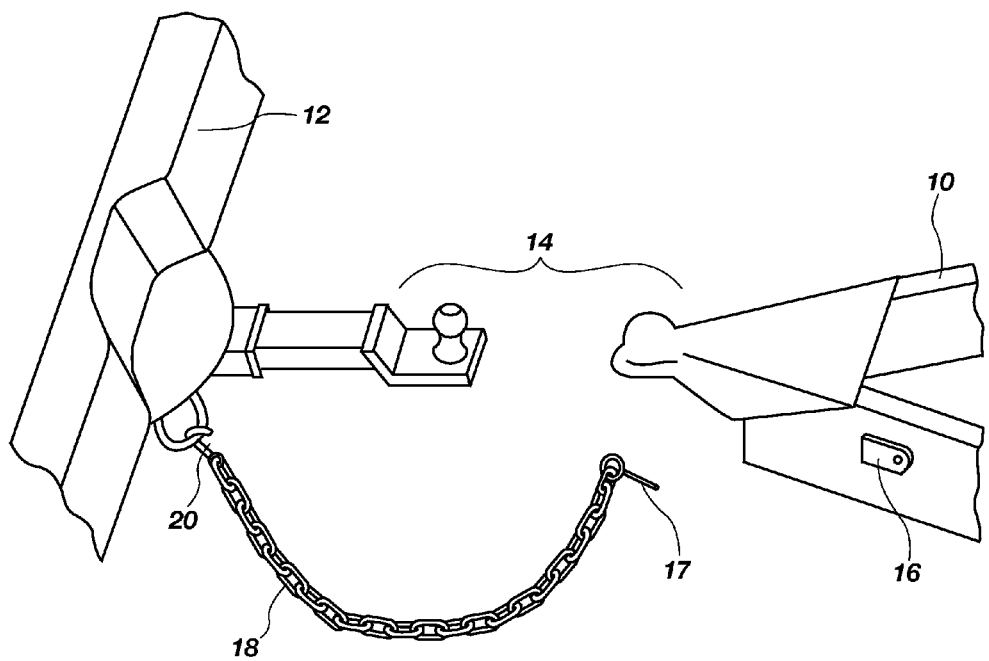
FIG. 5 is illustrative of a chain used in a breakaway switching mechanism wherein the trailer is disconnected from the tow vehicle and the chain has pulled the pin from the safety switch.
Figure 6:
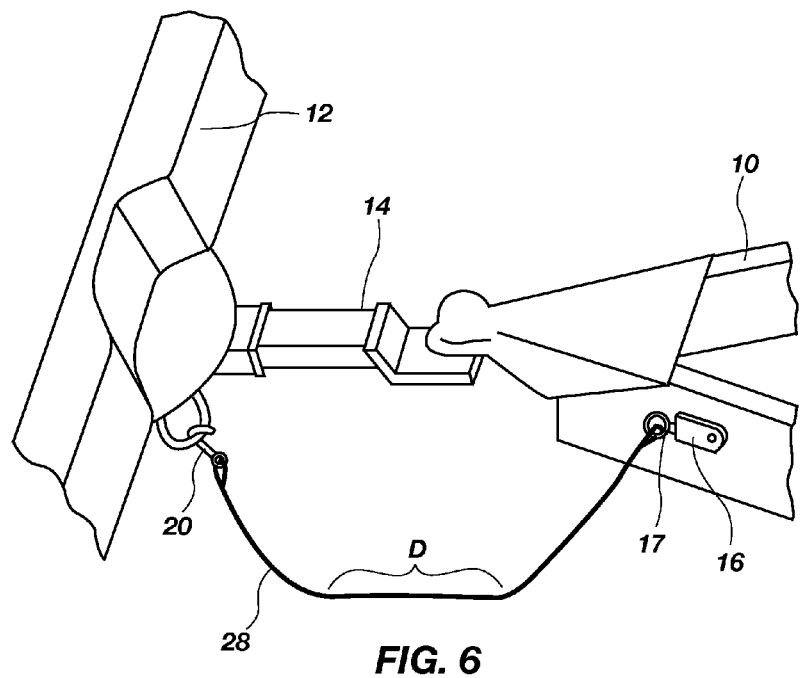
FIG. 6 is illustrative of a cable used in a breakaway switching mechanism wherein the trailer is connected to the tow vehicle and the cable drags on the ground.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "characterized by," and grammatical equivalents thereof are inclusive or open-ended terms that do not exclude additional, unrecited elements or method steps.

Applicant has discovered a coiled, biased, and resilient spring system where the actuation cable in the safety brake system may be held up off the road and may also allow the vehicle trailer to articulate without activating the trailer brake system. One embodiment is an apparatus or method that may integrate a coil spring into a cable structure by forming the cable into the shape of a coil spring so it contracts when it has slack and extends when under tension. This will require special forming of the cable and may be accomplished by coating it with plastic that can hold the spring shape, or by replacing the cable with a plastic coil that is strong enough to pull the pin from an electrical contact box or to activate a surge brake lever. An embodiment may have a retractable cable system such as a spooling mechanism that works by putting the cable into a biased spool that may be fashioned such that as the cable is unwound from the spool a spring is tensioned so that when the cable goes slack the spring rewinds the spool which winds the cable back onto the spool. This may be done by designing the spooling system strong enough to not release the cable when fully extended but rather allow it to pull the pin or actuate the surge brake lever. The spool apparatus may be attached to the tow vehicle to minimize road grime and water from entering it and corroding or gumming it up.

A method may include attaching a coil spring or rigid attachment between the trailer tongue jack and the center of the cable or to the trailer frame and to many points along the cable. Both methods would allow the cable to be held up to the trailer frame in one or more locations allowing smaller loops of slack so the cable did not hang low enough to contact the ground in a turn. All of these embodiments would allow the cable to serve its function when fully extended to pull and actuate the safety brake system.

Figure 7A:
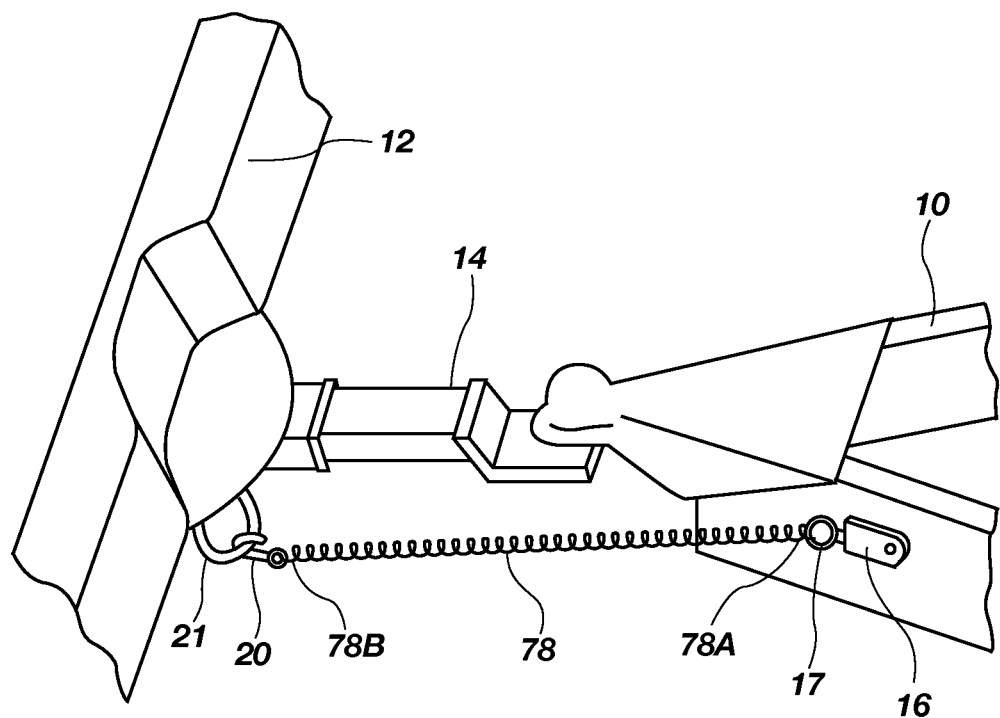
FIG. 7A is illustrative of an improved cable used in a breakaway switching mechanism wherein the trailer is connected to the tow vehicle and the cable is prevented from dragging on the ground by a biased cable structure.

Referring now to FIG. 7A, there is shown an improved cable 78 used in a breakaway switching mechanism wherein the trailer 10 is connected to the tow vehicle 12. The switching mechanism comprises a breakaway switch 16, a pin 17, a cable 78 and a tow vehicle attachment 20, which may comprise a hook. A biased coil spring may be integrally formed in the cable 78. The cable 78 may comprise a first terminal end 78A and a second terminal end 78B. The pin 17 may be attached to the first terminal end 78A of the cable 78 and the tow vehicle attachment 20 may be attached to the second terminal end 78B of the cable 78. In one embodiment, the tow vehicle attachement 20 may be pivotally attached to the second terminal end 78B of the cable 78. The tow vehicle attachment 20 may be connected to a hitch loop 21 extending from the tow vehicle 12. It will be appreciated that a pin may be an actuation member.

Figure 7B:
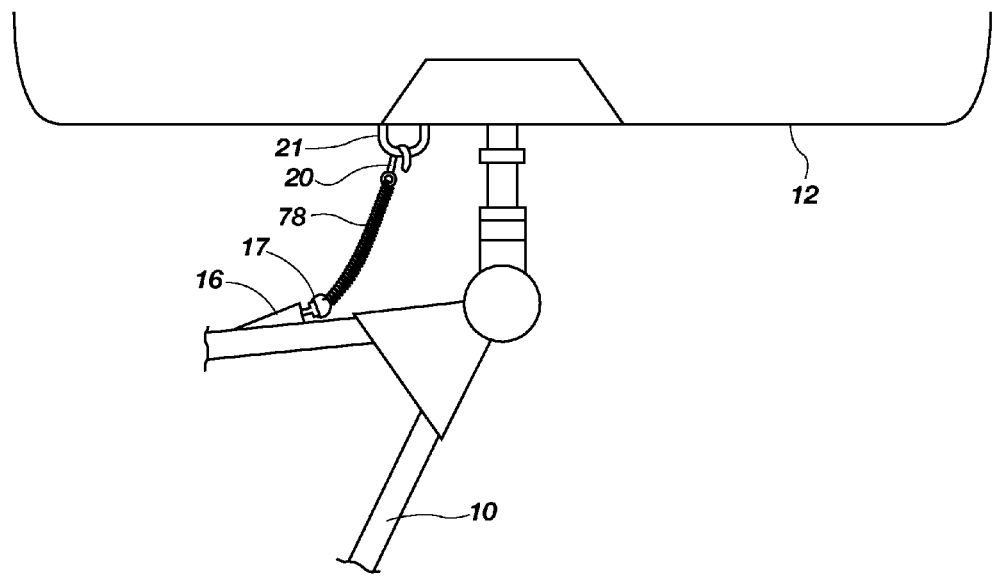
FIG. 7B is a top view of an improved cable used in a breakaway switching mechanism wherein the tow vehicle is executing a left turn.
Figure 7C:
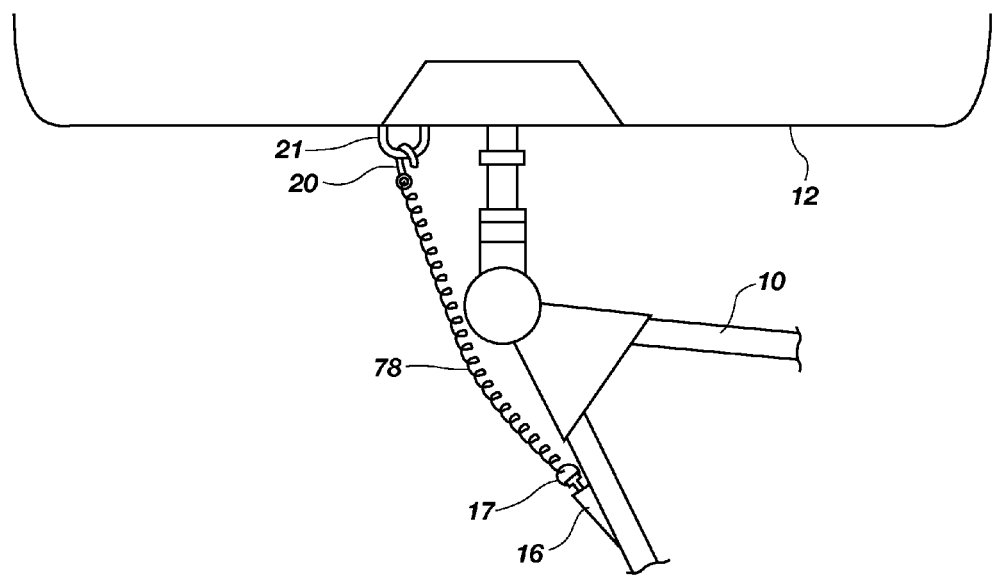
FIG. 7C is a top view of an improved cable used in a breakaway switching mechanism wherein the tow vehicle is executing a right turn.

As shown in FIG. 7A, the center lines of the tow vehicle 12 and the trailer 10 may be in direct alignment. That is, the trailer 10 may be traveling directly behind the tow vehicle 12 in a straight path. When the trailer 10 is directly behind the tow vehicle 12, the cable 78 may be tensioned. As shown in FIG. 7B, when the tow vehicle 12 is making a left-hand turn, the tension in the cable 78 may be less than when traveling in a straight path. However, the cable 78 may not drag on the ground because the cable 78 was tensioned when the trailer 10 was directly behind the tow vehicle 12. As shown in FIG. 7C, when the tow vehicle 12 is making a right-hand turn, the cable 78 may become more tensioned than when the trailer 10 is directly behind the tow vehicle 12. However, the tension of the cable 78 may not be sufficient to remove the pin 17 from the breakaway switch 16. It will be appreciated that the cable 78 is not sagging or near the ground where it can be damaged by dragging. The biased configuration of the cable 78 allows tow vehicle 12 and trailer 10 articulation without activating the trailer brakes or having the cable dragging on the ground.

Figure 7D:
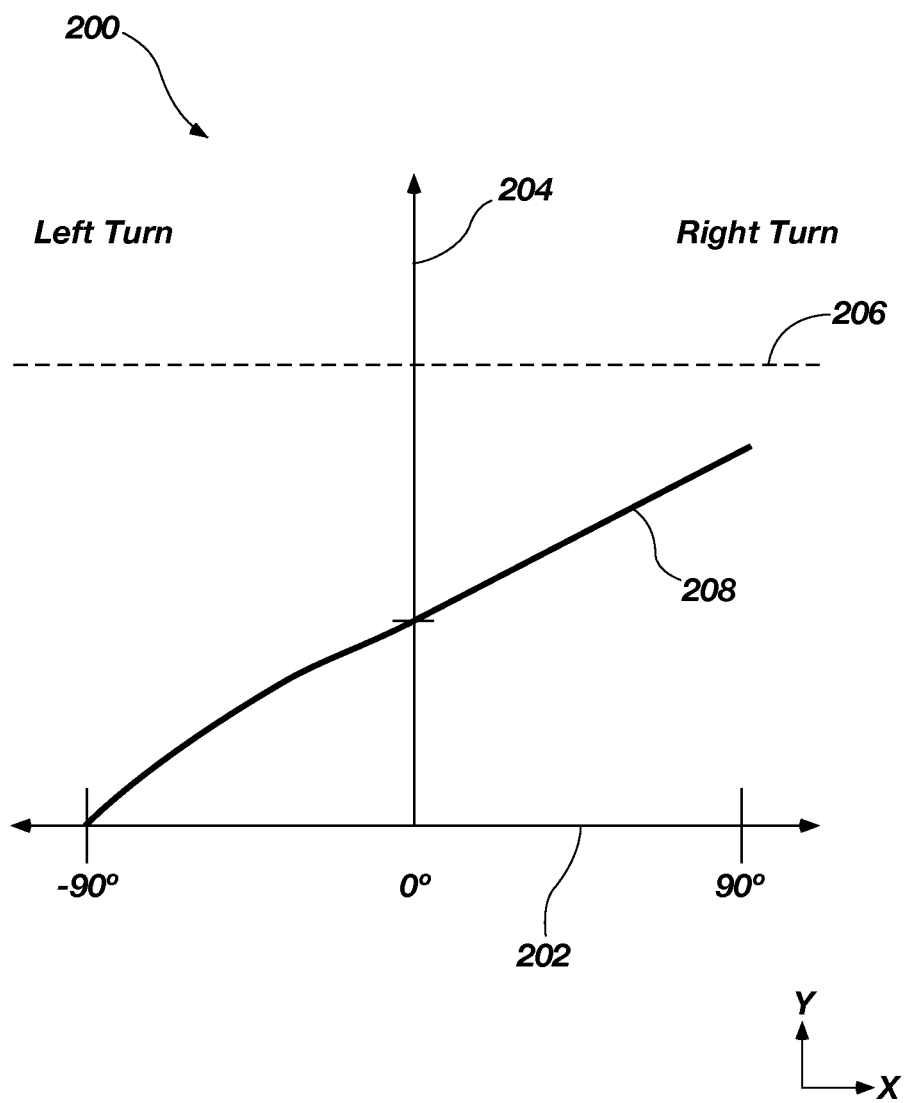
FIG. 7D is a graph depicting the tension in an improved cable during a right turn and a left turn by the tow vehicle.

Referring now to FIG. 7D, there is depicted a graph 200 pursuant to an embodiment of the present disclosure. The graph 200 includes an x-axis 202 and a y-axis 204. The x-axis 202 may represent an angle between the centerline of the tow vehicle 12 and the centerline of the trailer 10. The y-axis 204 may represent tension. The dashed horizontal line 206 may represent the tension required in order to remove the pin 17 from the breakaway switch 16. The line 208 may represent tension in the cable 78. From FIG. 7D, it may be observed that as the tow vehicle 12 makes a left turn, the tension in the cable 78 may decrease from its initial amount at 0 degrees. It may also be observed, that as the tow vehicle 12 makes a right turn, the tension in the cable 78 may increase from its initial amount at 0 degrees. It will be noted that the tension in the cable 78 never exceeds the amount of tension needed to remove the pin 17 from the breakaway switch indicated by line 206. The amount of tension in the cable 78 represented by the line 208 may be linear or non-linear. In an embodiment of the present disclosure, the amount of tension in the cable 78 may reach zero prior to −90 degrees. That is, the cable 78 may go slack at anywhere from about −1 degree to about −89 degrees.

One embodiment is an apparatus or method that may integrate a coil spring into a cable 78 by forming the cable 78 into the shape of a coil spring so it contracts when it has slack and extends when under tension. This will require special forming of the cable 78 that may be accomplished by coating it with plastic, rubber, or some other material that can hold a spring shape. Or by replacing the cable with a coil that is strong enough to pull the pin from an electrical contact box or to activate a surge brake lever when extended beyond a limit.

Figure 8A:
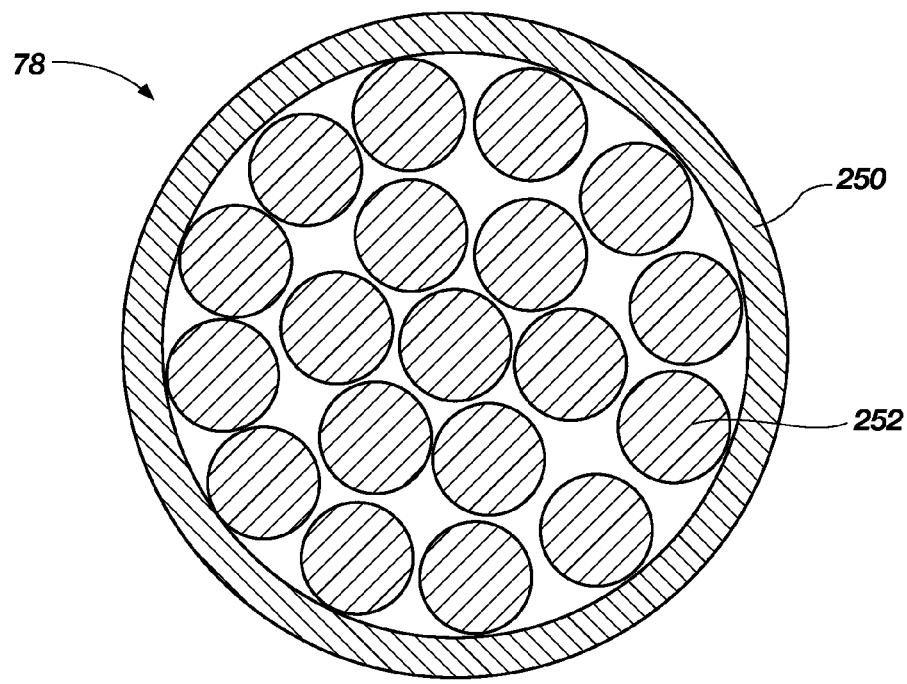
FIG. 8A is a cross-sectional view of an improved cable pursuant to an embodiment of the present disclosure.

Referring now to FIG. 8A, there is depicted a cross-sectional view of the cable 78 pursuant to an embodiment of the present disclosure. The cable 78 may comprise an outer layer 250. The outer layer 250 may also be a coating or a sheath. The outer layer 250 may comprise plastic, rubber, vinyl, some other material, or any other suitable coating or sheathing material. The outer layer 250 may encapsulate individual strands 252 made of metal. The strands 252 may run side-by-side, twisted or braided together. The formation of the outer layer 250 may cause the strands 252, and a length of the cable 78, to be coiled. Alternatively, the cable 78 may have coils integrally formed therein or otherwise formed in any suitable manner that is not caused by formation of the outer layer 250. The coils of the cable 78 may be said to comprise coils of a coil spring, such that the cable 78 has a coil spring formed therein. It is further to be understood that the outer layer 250 is optional, and as such, a suitable embodiment of the present disclosure can be made without an outer layer 250.

Figure 8B:
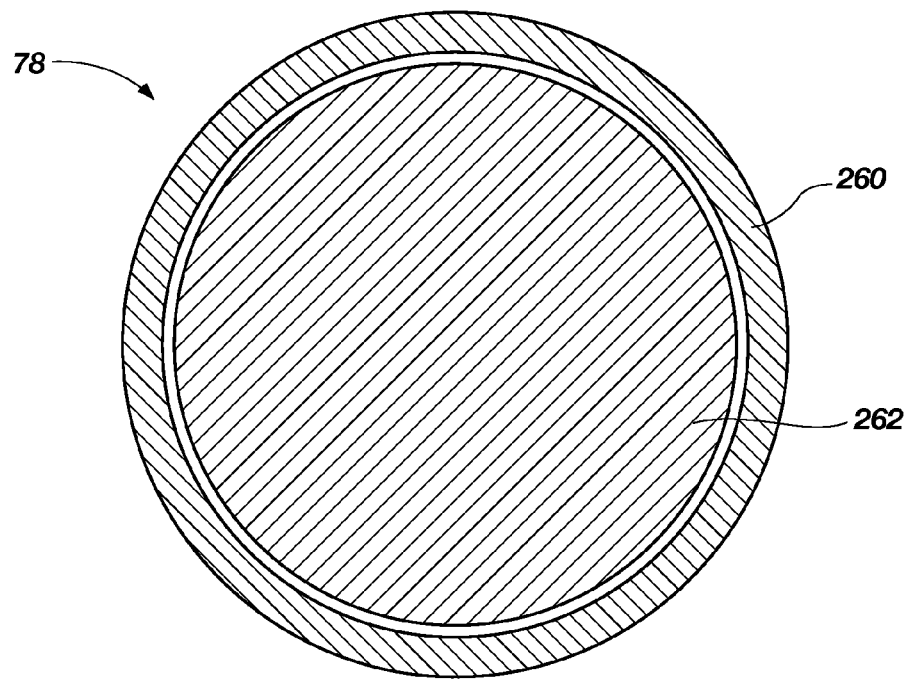
FIG. 8B is a cross-sectional view of an improved cable pursuant to an embodiment of the present disclosure.

Referring now to FIG. 8B, there is depicted a cross-sectional view of the cable 78 pursuant to an embodiment of the present disclosure. The cable 78 may comprise an outer layer 260. The outer layer 260 may comprise plastic, vinyl, rubber, or some other material. The outer layer 260 may encapsulate a single strand 262 made of metal. The formation of the outer layer 260 may cause the strand 262, and a length of the cable 78, to be coiled.

Figure 8C:
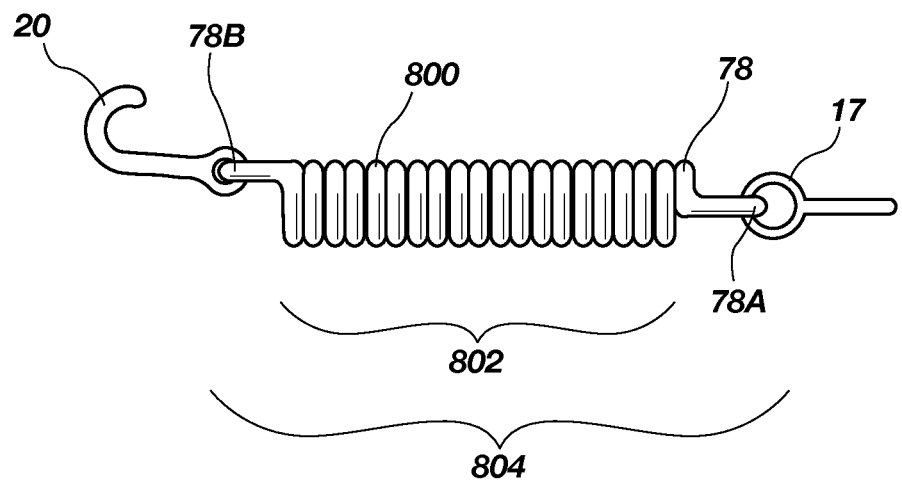
FIG. 8C is a side view of an improved cable pursuant to an embodiment of the present disclosure.

Referring now to FIG. 8C, there is depicted a side view of an improved cable 78 pursuant to an embodiment of the present disclosure. The cable 78 is depicted in FIG. 8C in an unbiased state, meaning that the cable 78 is not stretched or is untensioned. The cable 78 includes a plurality of coils 800, a first end 78A, and a second end 78B. In some embodiments, the cable 78 includes tow vehicle attachment 20 and a pin 17. The cable is connectable to a tow vehicle 12 and a trailer 10 and may operate to activate a braking system on the trailer 10 in response to the trailer 10 becoming unhitched from the tow vehicle 12.

As described above, in some embodiments, at least a portion of the cable 78 is formed into a coil spring shape. The resulting coil spring shape may include a plurality of coils 800. The plurality of coils 800 may be distributed along the length of the cable at a frequency of a number of coils per distance. For example, in an untensioned state, the plurality of coils may be distributed along the length of the cable at a frequency of approximately ten coils per inch.

The cable 78 may include any number of coils 800. For example, the cable 78 may include between fifteen and thirty coils 800. In some embodiments, the number of coils in the cable is proportional to a stretched (or uncoiled) length of the cable 78. For example, a cable 78 having a stretched (or uncoiled) length of four feet may have eighteen coils, and a cable 78 having a stretched (or uncoiled) length of six feet may have twenty seven coils. It will be appreciated that the cable 78 may have any stretched (or uncoiled) length. For example, the cable 78 may have a stretched (or uncoiled) length of between three and seven feet. In another example, the cable 78 may have a stretched (or uncoiled) length of approximately four feet. In yet another example, the cable 78 may have a stretched (or uncoiled) length of approximately six feet.

In some embodiments, the cable 78 includes an overall length 804 and a coil length 802. The coil length 802 may be any length equal to or less than the overall length 804. In one embodiment, the coil length 802 may be a majority of the overall length 804 of the cable 78. The overall length 804 may also be described as the absolute length of the cable 78, with the understanding that the absolute or overall length 804 either does not change, or does not appreciably change regardless of whether the coils 800 are in an unbiased state or a biased (or stretched) state.

Figure 8D:
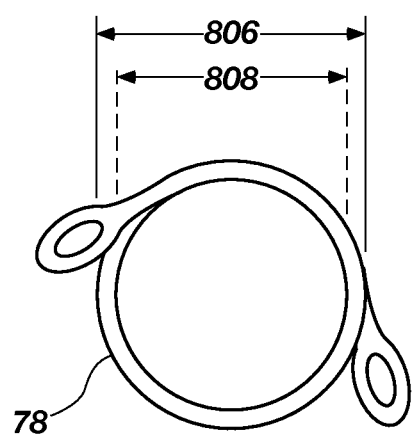
FIG. 8D is an end view of an improved cable pursuant to an embodiment of the present disclosure.

Referring to FIG. 8D, there is depicted an end view of an improved cable 78 pursuant to an embodiment of the present disclosure. The cable 78, in the illustrated embodiment, is coiled. The coiled cable 78 may be coiled into an approximately circular shape. It will be appreciated, however, that the cable 78 may be coiled into any shape capable of generating tension in the cable 78 when the cable 78 is biased. For example, the cable 78 may be coiled in a hexagonal shape.

In some embodiments, the cable 78 may be coiled such that the coils have an outer diameter 806 and an inner diameter 808. The outer diameter 806 and the inner diameter 808 may be any diameter capable of generating tension in the cable 78 as it is biased. For example, the cable 78 may have an outer diameter 806 of between 0.85 inches and 1.25 inches. In another example, the cable 78 may have an outer diameter 806 of approximately 0.9 inches. In yet another example, the cable 78 may have an inner diameter 808 of between 0.7 inches and 1.1 inches. In another example, the cable 78 may have an inner diameter 808 of approximately 0.75 inches.

Figure 9A:
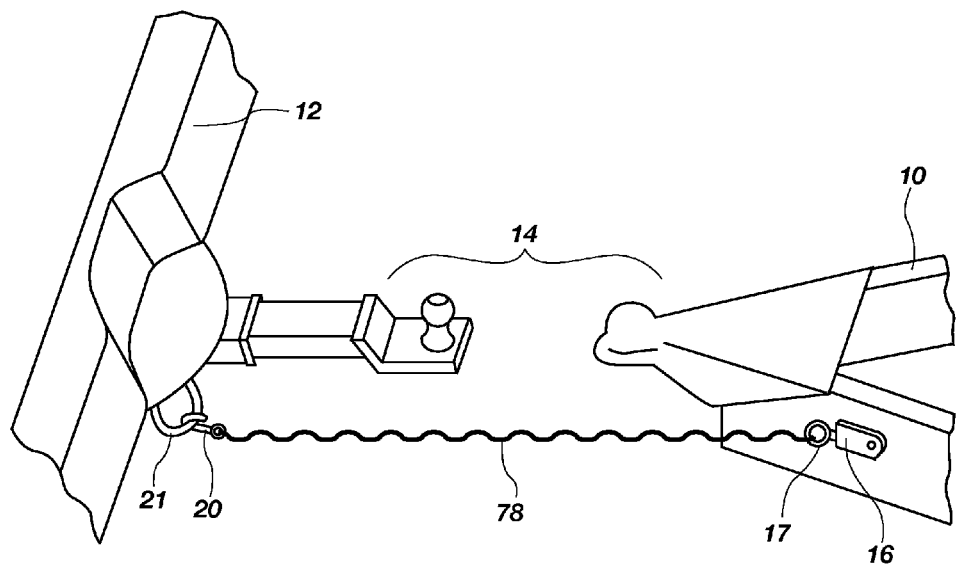
FIG. 9A is illustrative of an improved cable used in a breakaway switching mechanism wherein the trailer has become disconnected from the tow vehicle and the cable is stretched against the biased cable structure by the drag of the trailer.

Referring to FIG. 9A, there is depicted the trailer 10 becoming unhitched from the tow vehicle 12 while the tow vehicle 12 is in motion. The trailer 10 may become disconnected from the tow vehicle 12 for a wide variety of reasons. For example, unhitching may be due to failure of the hitch locking mechanism (not shown). Also, the trailer 10 may become disconnected by failure to properly engage the hitch locking mechanism (not shown) to the ball of the hitch. As can be observed, the cable 78 has been pulled taught by the increased separation between the tow vehicle 12 and the trailer 10 such that the coils of the spring reach a maximum tension.

Figure 9B:
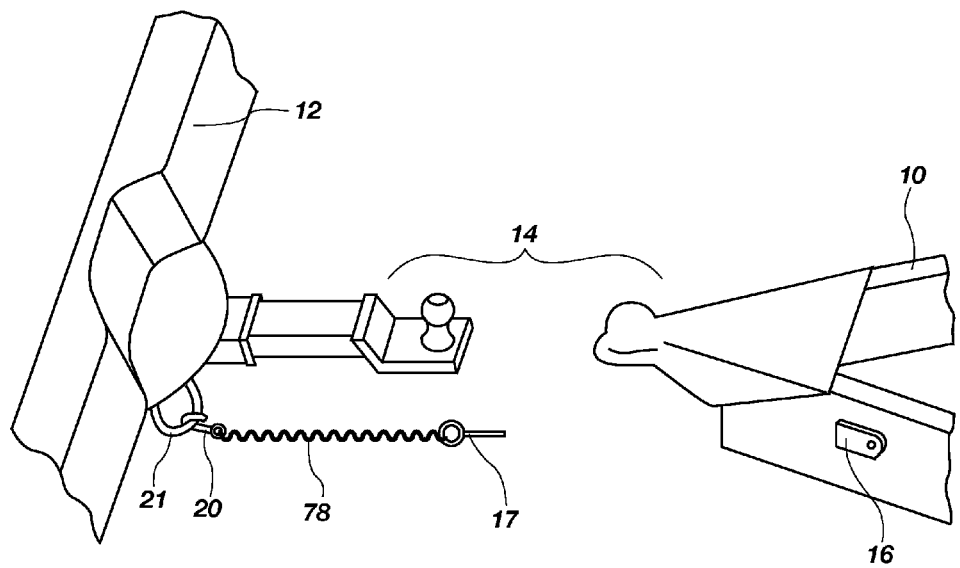
FIG. 9B is illustrative of an improved cable used in a breakaway switching mechanism wherein the trailer has become disconnected from the tow vehicle and the cable is stretched beyond a limit such that the safety switch is activated.

As can be observed in FIG. 9B, when the distance separating the trailer 10 and the tow vehicle 12 reaches a predetermined distance, the tension in the cable 78 may overcome the resistance holding the pin 17 in the breakaway switch 16. The pin 17 may then be pulled from the breakaway switch 16 and the safety brakes (not shown) of the trailer 10 will automatically engage as is known to one having ordinary skill in the art. The cable 78 may then snap back to its rest state due to the spring and coiled nature of the cable 78.

Figure 9C:
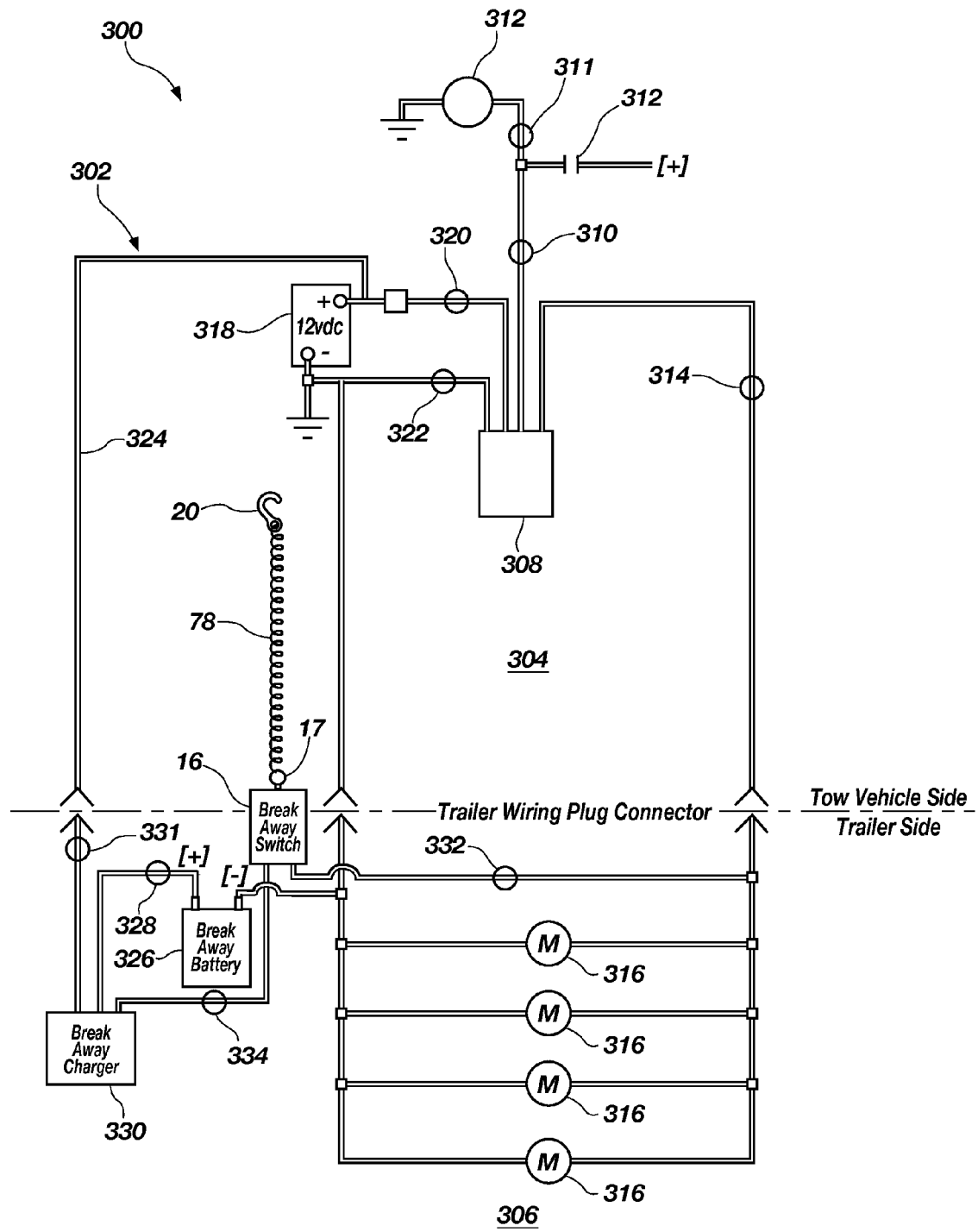
FIG. 9C is illustrative of an electric trailer braking system pursuant to an embodiment of the present disclosure.

Referring now to FIG. 9C, there is depicted a wiring diagram 300 for an electric brake system 302 for a trailer and a tow vehicle pursuant to an embodiment of the present disclosure. As can be observed, the diagram 300 may include a tow vehicle side 304 and a trailer side 306. The tow vehicle side 304 of the diagram 300 may include an electric brake controller 308. A wire 310 may be connected to a control wire 311 extending between a brake switch 312, such as a pedal, and tow vehicle stop lights 312. The wire 310 may indicate to the controller 308 when the brake switch 312 is actuated, e.g., when the driver of the tow vehicle presses the brake pedal.

When the brake switch 312 is actuated, the controller 308 may energize a wire 314 which activates magnets 316 to thereby engage brakes (not shown) on the trailer. A positive terminal of a battery 318 of the tow vehicle may be connected by a wire 320 to the controller 308. A negative terminal of the battery 318 may also be connected to the controller 308 by a wire 322.

On the trailer side 306, the trailer may include the breakaway switch 16. A wire 328 may be connected to a positive lead of a battery 326. The wire 328 may lead to a battery charger 330. A wire 331 may connect the charger 330 to a wire 324 that is connected to the positive terminal of the battery 318. A negative terminal of the battery 326 may be connected to magnets 316. A wire 332 from the breakaway switch 16 may be connected to the other side of the magnets 316. A wire 334 may connect the breakaway switch 16 to the positive terminal of the battery 326 through the charger 330.

When installed into the breakaway switch 16, the pin 17 may interrupt, or hold open, a connection between the wires 332 and 334. If the tow vehicle becomes separated from the trailer, the cable 78 and attachment 20 may cause the pin 17 to be pulled from the switch 16. The removal of the pin 17, causes the connection between the wires 334 and 332 to be made, or closed, and the magnets 316 become energized to thereby apply the trailer brakes, which may be disc or drum brakes.

Figure 10A:
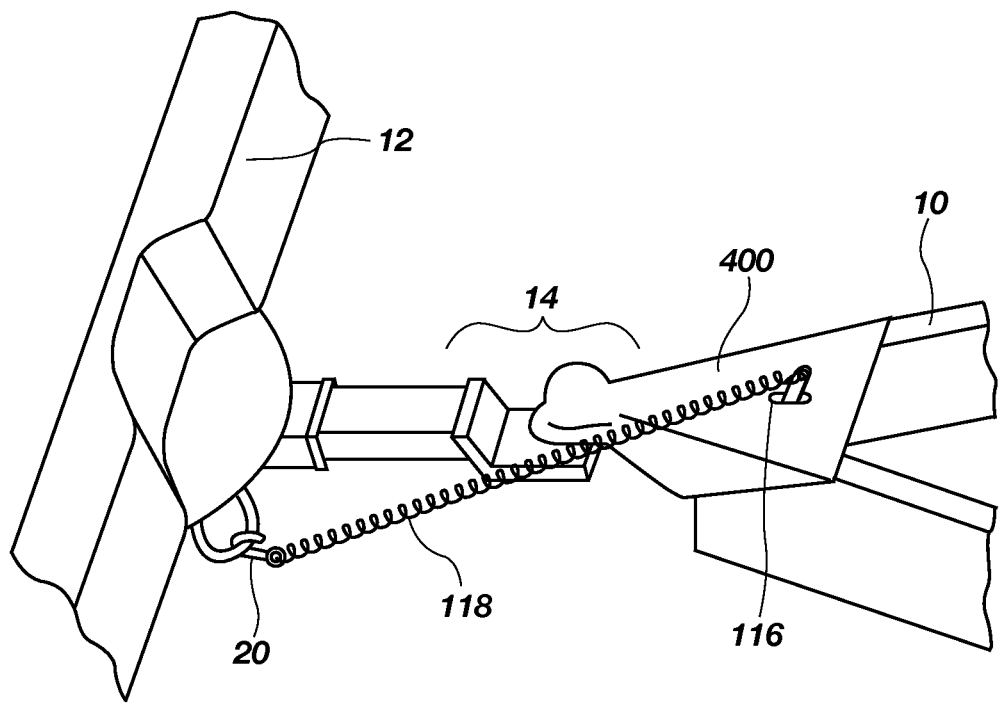
FIG. 10A is illustrative of an improved cable used in a breakaway switching mechanism wherein the trailer is connected to the tow vehicle and the cable is prevented from dragging on the ground by a biased cable structure.

FIGS. 10A, 10B and 11 are illustrative of an improved cable 118 used in a breakaway switching mechanism for use with a trailer having a hydraulically operated surge brake system. In particular, a tongue of the trailer 400 may comprise a hydraulically operated brake system 402, such as a surge brake system. As best seen in FIG. 10B, the hydraulic surge brake system 402 may comprise a master cylinder 404. The master cylinder 404 may be filled with brake fluid as is known to one having ordinary skill in the art. It will be further noted that the master cylinder 404 may be part of a surge brake system. A line 406 may connect the master cylinder 404 to brakes 408. In an embodiment of the present disclosure, the brakes 408 may be one of disc or drum brakes.

A piston 410 may be disposed inside of the master cylinder 404. The piston 410 may be extended further into the master cylinder 404 to thereby force the brake fluid into the line 406 and then cause the brakes 408 to be engaged. The piston 410 may be connected to a rod 412. The rod 412 may also be connected to an end 116A of the lever 116. The lever 116 may be pivotally mounted on structure (not shown) by a shaft 416. A first end 118A of the cable 118 may be connected to an end 116B of the lever 116. A second end 118B of the cable 118 may be connected to a tow vehicle attachment 20.

A biased coil spring may be formed in the cable 118 and attached to a breakaway lever 116 and tow vehicle 12. It is noted that the cable 118 is not sagging or near the ground where it can be damaged by dragging. The biased configuration of the cable 118 allows tow vehicle 12 and trailer 10 articulation without activating the trailer brakes or having the cable dragging on the ground.

Figure 10C:
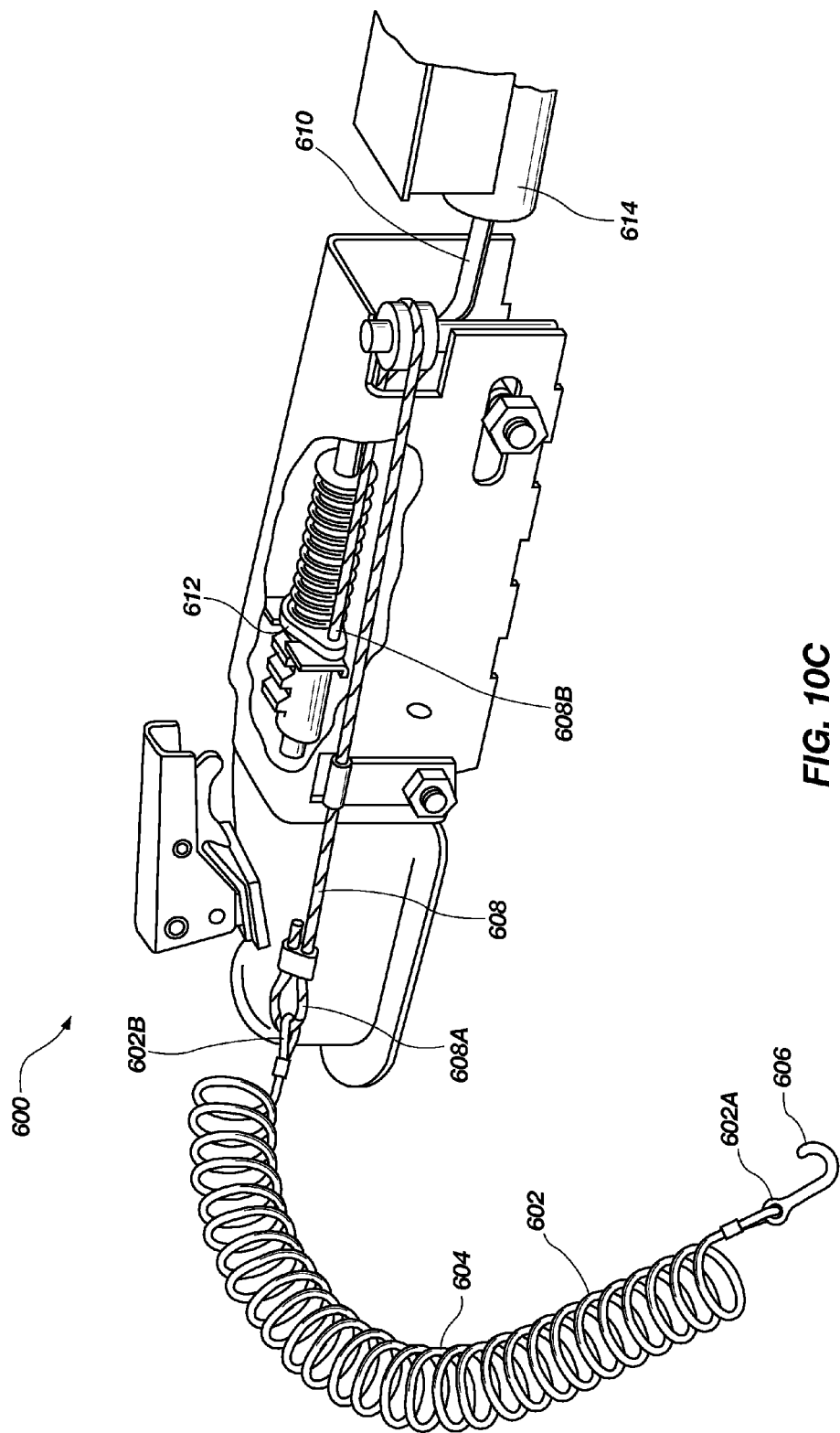
FIG. 10C is illustrative of a hydraulic trailer braking system assembly pursuant to an embodiment of the present disclosure.
Figure 10D:
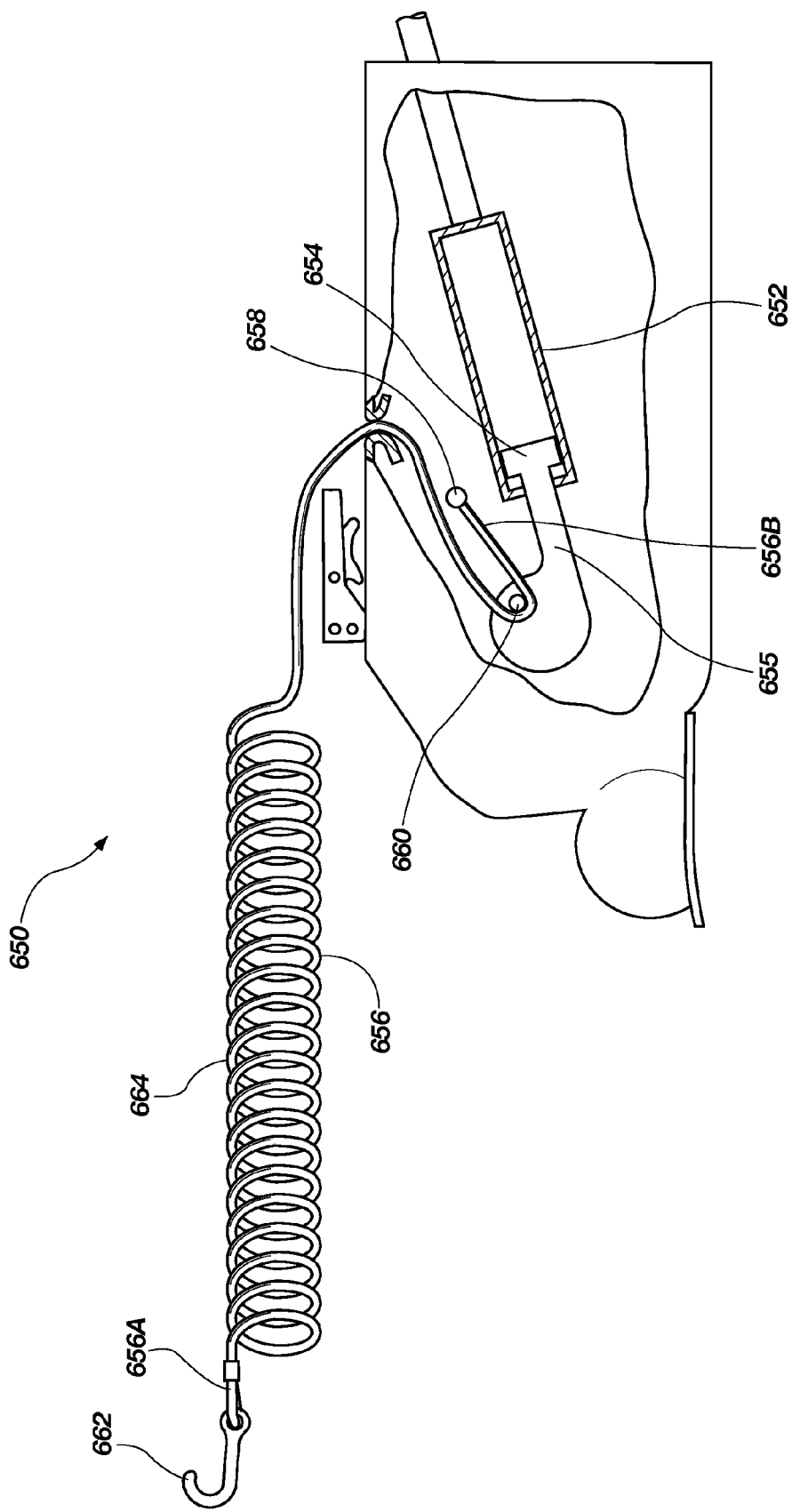
FIG. 10D is illustrative of a hydraulic trailer braking system pursuant assembly to an embodiment of the present disclosure.
Figure 10E:
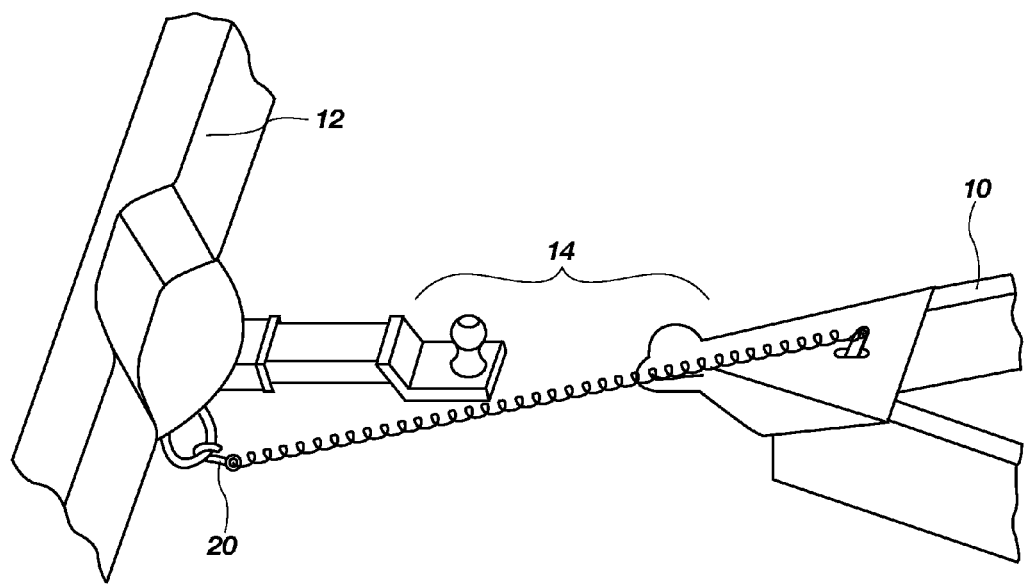
FIG. 10E is illustrative of an improved cable used in a breakaway switching mechanism wherein the trailer has become disconnected from the tow vehicle and the cable is stretched against the biased cable structure by the drag of the trailer moving a safety lever.

As perhaps best seen in FIG. 10E, the trailer 10 may become disconnected, as shown by bracket 14, from the tow vehicle 12 and the improved cable 118 may be pulled taught such that the coils of the spring reach a predetermined tension and the lever 116 is moved into an actuated position in the direction of the arrow, thereby actuating a safety braking mechanism. In particular, the actuation of the lever 116 may cause the piston 410 in the master cylinder 404 to extend further into the cylinder 404 to thereby cause brake fluid to move through the line 406 to thereby engage the brakes 408 as shown in FIG. 10B. It will be further noted that the master cylinder 404 may be part of a surge brake system.

As shown in FIG. 10C, there is depicted a suitable hydraulic surge brake assembly 600 pursuant to an embodiment of the present disclosure. The assembly 600 may include a breakaway cable 602. The cable 602 may include a plurality of integrated coils 604. Disposed at a first end 602A of the cable 602 may be a tow vehicle attachment member 606, which may take the form of a hook. A second end 602B of the cable 602 may be connected to a first end 608A of a cable 608. A second end 608B of the cable 608 may be connected to a push rod 610. In particular, the second end 608B of the cable 608 may be connected to a collar 612 which is coupled to the push rod 610.

The assembly 600 may include a master cylinder 614. The push rod 610 may be attached to a piston (not shown) inside of the master cylinder 614. When the tow vehicle becomes detached from the trailer on which the assembly 600 may be mounted, the cable 602 is pulled tight thereby causing the cable 608 to pull the collar 612, which in turn causes the push rod 610 to extend into the master cylinder 614 to thereby engage the trailer brakes.

Referring now to FIG. 10D, there is depicted a suitable hydraulic surge brake assembly 650 pursuant to an embodiment of the present disclosure. The assembly 650 may comprise a master cylinder 652. A piston 654 may be disposed inside of the master cylinder 652. A push rod 655 may be connected to the piston 654. A first end 656B of a cable 656 may be attached to an anchor point 658. A portion of the cable 656 may pass around a pin 660 extending from the push rod 655. A second end 656A of the cable 656 may be attached to a tow vehicle attachment member 662. The cable 656 may have coils 664 integrated therein. When the tow vehicle becomes detached from the trailer on which the assembly 650 may be mounted, the cable 656 is pulled tight thereby causing the cable 656 to pull the pin 660, which in turn causes the push rod 655 to extend into the master cylinder 652 to thereby engage the trailer brakes.

It will be appreciated that a push rod connected to a piston in a master cylinder of a hydraulic braking system assembly may constitute an actuation member for purposes of this disclosure. It will be further appreciated that the concept of a cable being connected to an actuation member includes both direct and indirect connections to the actuation member. That is, a cable is considered connected to an actuation member if the cable is able to cause the actuation member to engage the trailer brakes upon a trailer becoming detached from a tow vehicle.

FIGS. 11A, 11B, 11C, and 11D are illustrative of a biased spooling mechanism 128 used in a breakaway switching mechanism wherein the trailer 10 is connected to the tow vehicle 12. As perhaps best seen in FIG. 11B, the spooling mechanism 128 may comprise a housing 500. A spool 502 may be rotatably mounted on a shaft 504. A cable 126 may be wound up on the spool 502. The cable 126 may exit the housing 500 through aperture 506. Connected to an end 508 of the cable 126 may be a pin 17. A tow vehicle attachment 20 may be connect to, and extend from, the housing 500. A spring 510 may be disposed in the housing 500. The spring 510 may be operable to bias the spool 502 to thereby retract the cable 126 into the housing 500.

Referring back to FIGS. 11A, 11B, 11C, and 11D, the biased spooling mechanism 128 with cable 126 may be attached to breakaway switch 16 and tow vehicle 12. In particular, the pin 17 may be inserted into the breakaway switch 16 and the tow vehicle attachment 20 may be installed onto the tow vehicle 12. The biased spool 128 prevents the cable 126 from sagging or dragging on the ground where it can be damaged. The spring configuration of the biased spooling mechanism 128 may allow the tow vehicle 12 and the trailer 10 to move in articulation without activating brakes or allowing the cable 126 to drag on the ground. For example, the biased spooling mechanism 128 retracts and extends the cable 126 as needed. In the case of a separation of the tow vehicle 12 and trailer 10, the cable 126 would be fully extended and pull the pin 17 from the brake breakaway switch 16.

Figure 11A:
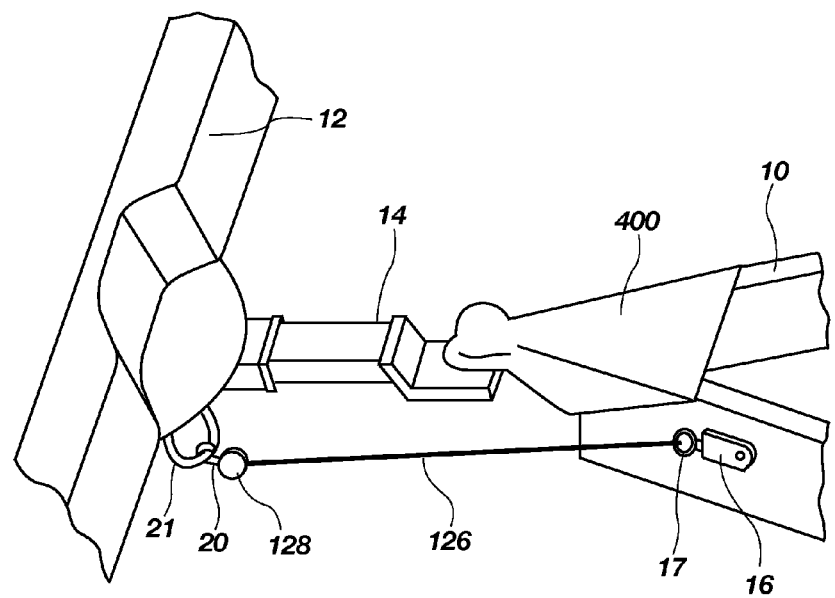
FIG. 11A is illustrative of a biased spooling mechanism used in a breakaway switching mechanism wherein the trailer is connected to the tow vehicle.
Figure 11B:
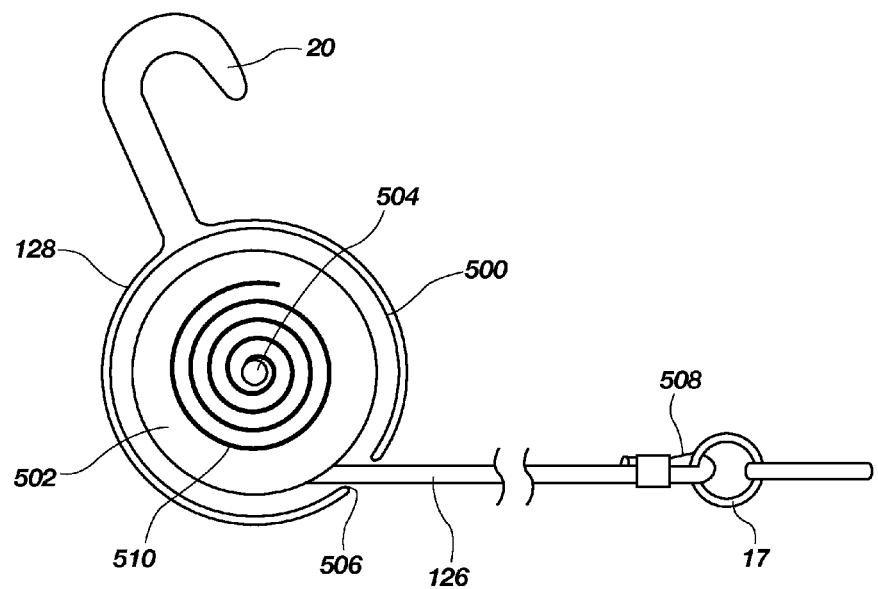
FIG. 11B is illustrative of a biased spooling mechanism used in a breakaway switching mechanism.
Figure 11C:
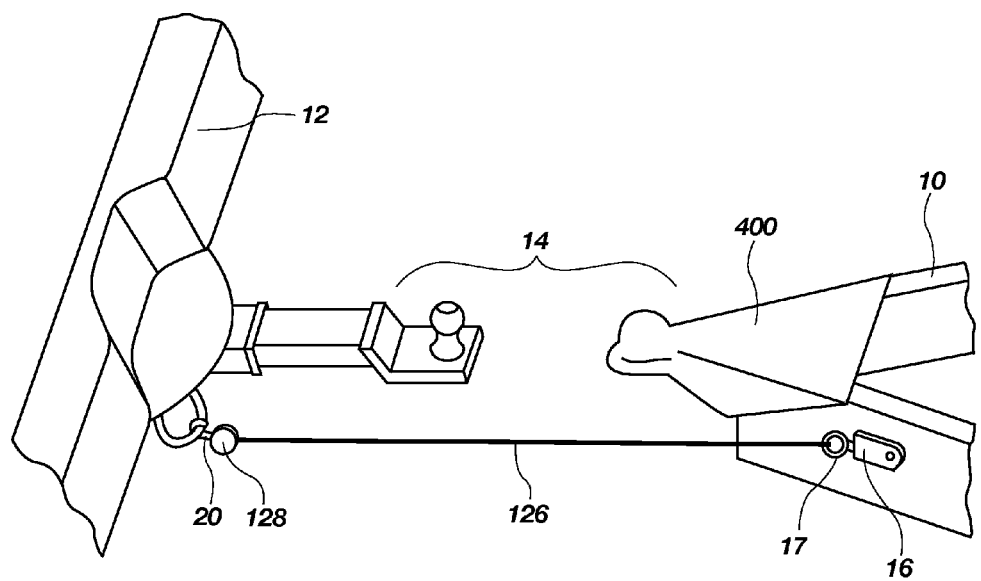
FIG. 11C is illustrative of a biased spooling mechanism used in a breakaway switching mechanism wherein the trailer is disconnected from the tow vehicle and the cable is de-spooled from the spooling mechanism.
Figure 11D:
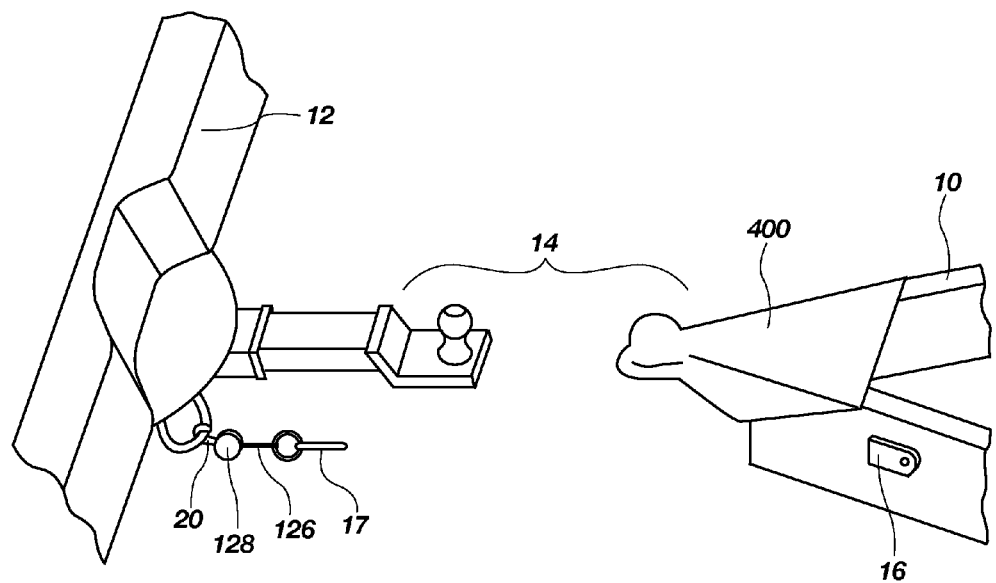
FIG. 11D is illustrative of a biased spooling mechanism used in a breakaway switching mechanism wherein the trailer is disconnected from the tow vehicle and the cable is de-spooled from the spooling mechanism beyond a limit such that the safety switch is activated.

FIG. 11C is illustrative of the biased spooling mechanism 128 used in a breakaway switching mechanism wherein the trailer 10 may become disconnected from the tow vehicle 12 and the cable 126 is de-spooled from the spooling mechanism 128. FIG. 11D is illustrative of the biased spooling mechanism 128 used in a breakaway switching mechanism wherein the trailer 10 may become disconnected from the tow vehicle 12 and the cable 126 may be de-spooled from the spooling mechanism 128 beyond a predetermined limit such that the safety switch 16 is activated, that is, the cable 126 pulls the pin 17 from the switch 16. Once the pin 17 has been removed, the cable 126 may then be retracted into the housing 500 of the mechanism 128.

Figure 12:
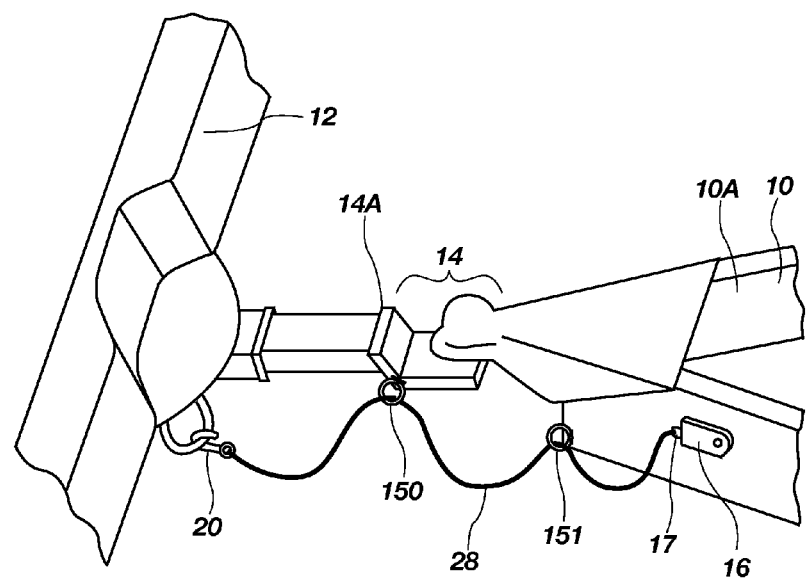
FIG. 12 is illustrative of a multi point mechanism used in a breakaway switching mechanism wherein the trailer is connected to the tow vehicle.

Referring now to FIG. 12, there is illustrated a multipoint support mechanism used in a breakaway switch 16 wherein the trailer 10 may be connected to the tow vehicle 12. In the embodiment, the cable 28 may be held from dragging by a plurality of cable guides 150 and 151 positioned along the length of the cable 28. In an embodiment of the present disclosure, the guides 150 and 151 may each comprise a ring. The guide 150 may be attached to the hitch 14A and the guide 151 may be attached to a tongue 10A of the trailer 10.

Figure 13:
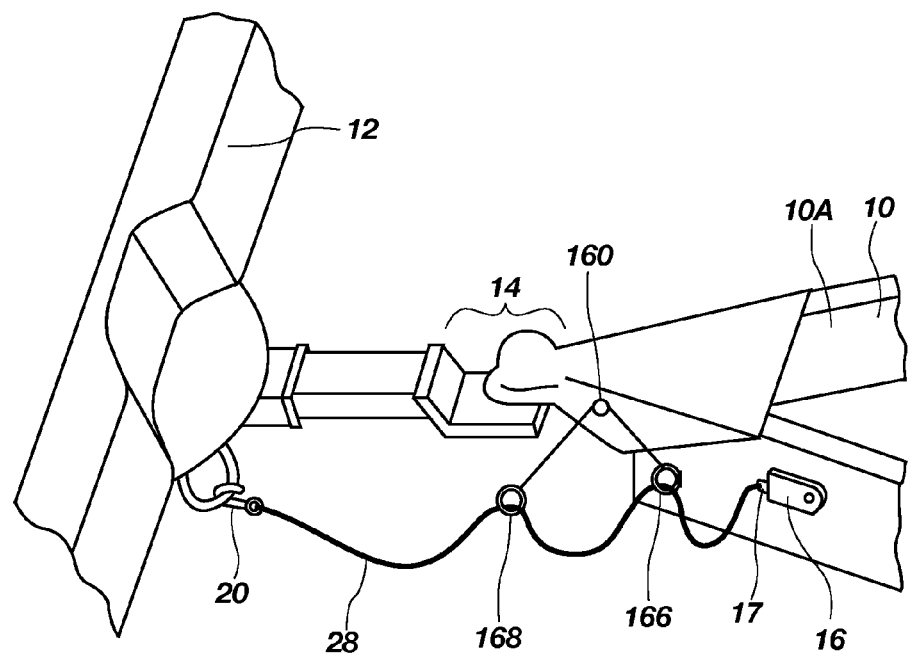
FIG. 13 is illustrative of a multi point mechanism used in a breakaway switching mechanism wherein the trailer is connected to the tow vehicle.

Referring now to FIG. 13, there is illustrated a multi point mechanism used in a breakaway switch 16 wherein the trailer 10 is connected to the tow vehicle 12. In the embodiment, the cable 28 may be held from dragging by a plurality of guides 166 and 168 positioned along its length by a retention device 160. Retention device 160 may be a resilient, flexible or rigid member. The guides 166 and 168 may be disposed on opposing ends of the retention device 160. The retention device 160 may be secured to a tongue 10A of the trailer 10. For example, the retention device 160 may be secured by a fastener to the tongue 10A of the trailer 10. The guides 166 and 168 and the retention device 160 may prevent the cable 28 from sagging and dragging on the ground.

Figure 14:
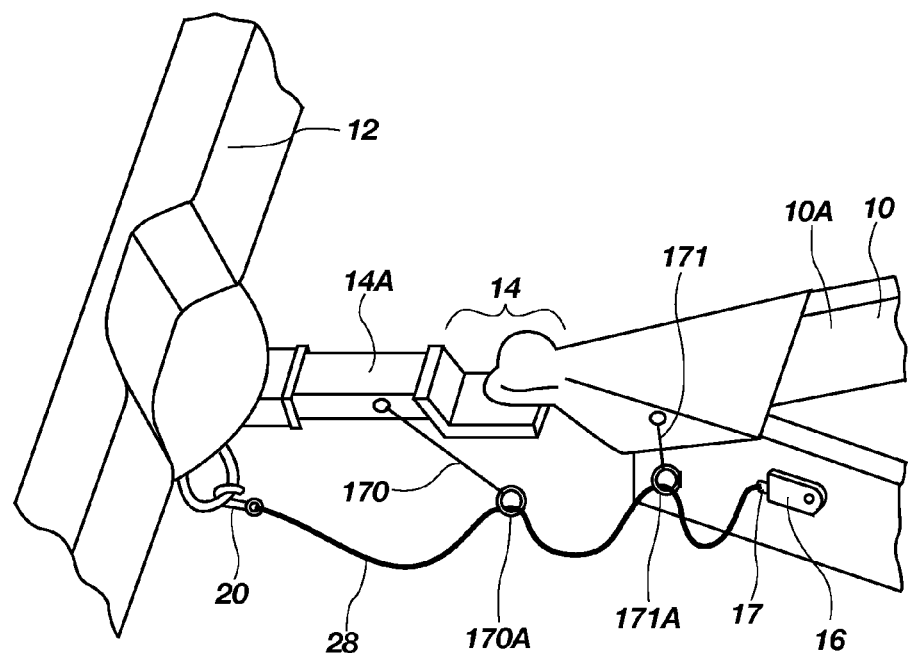
FIG. 14 is illustrative of a multi point mechanism used in a breakaway switching mechanism wherein the trailer is connected to the tow vehicle.

FIG. 14 is illustrative of a plurality of retention devices 170 and 171 used in a breakaway switch 16 wherein the trailer 10 may be connected to the tow vehicle 12. In the embodiment, the cable 28 may be held from dragging by a plurality of retention devices 170 and 171. The retention device 170 may include a guide 170A on a first end and may be attached to a hitch 14A on the other end. The retention device 171 may include a guide 171A on a first end and may be attached to a tongue 10A of the trailer 10. The retention devices 170 and 171A may be include a resilient, flexible or rigid member.

Figure 15:
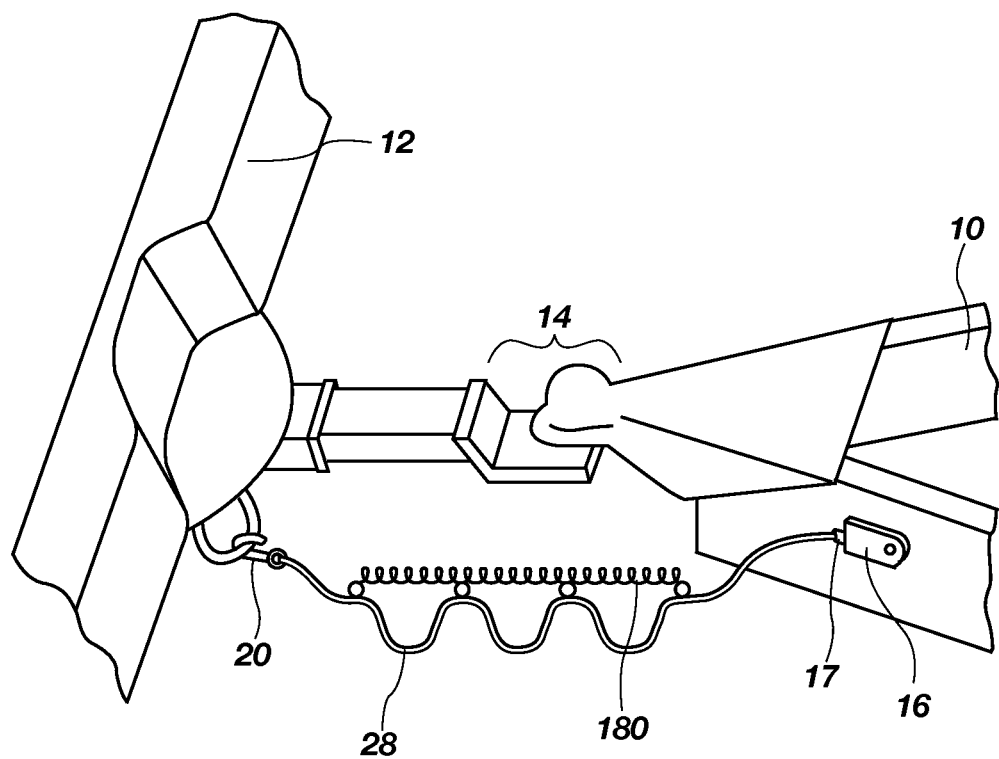
FIG. 15 is illustrative of a biased multi point mechanism used in a breakaway switching mechanism wherein the trailer is connected to the tow vehicle.

FIG. 15 is illustrative of a plurality of retention points 180A, 180B, 180C and 180D with a biased member 180 that may be used in a breakaway switch 16 wherein the trailer 10 is connected to the tow vehicle 12. In the embodiment the cable 28 may be held from dragging by a plurality of retention and a tensive force provided by the biased member 180.

Figure 16:
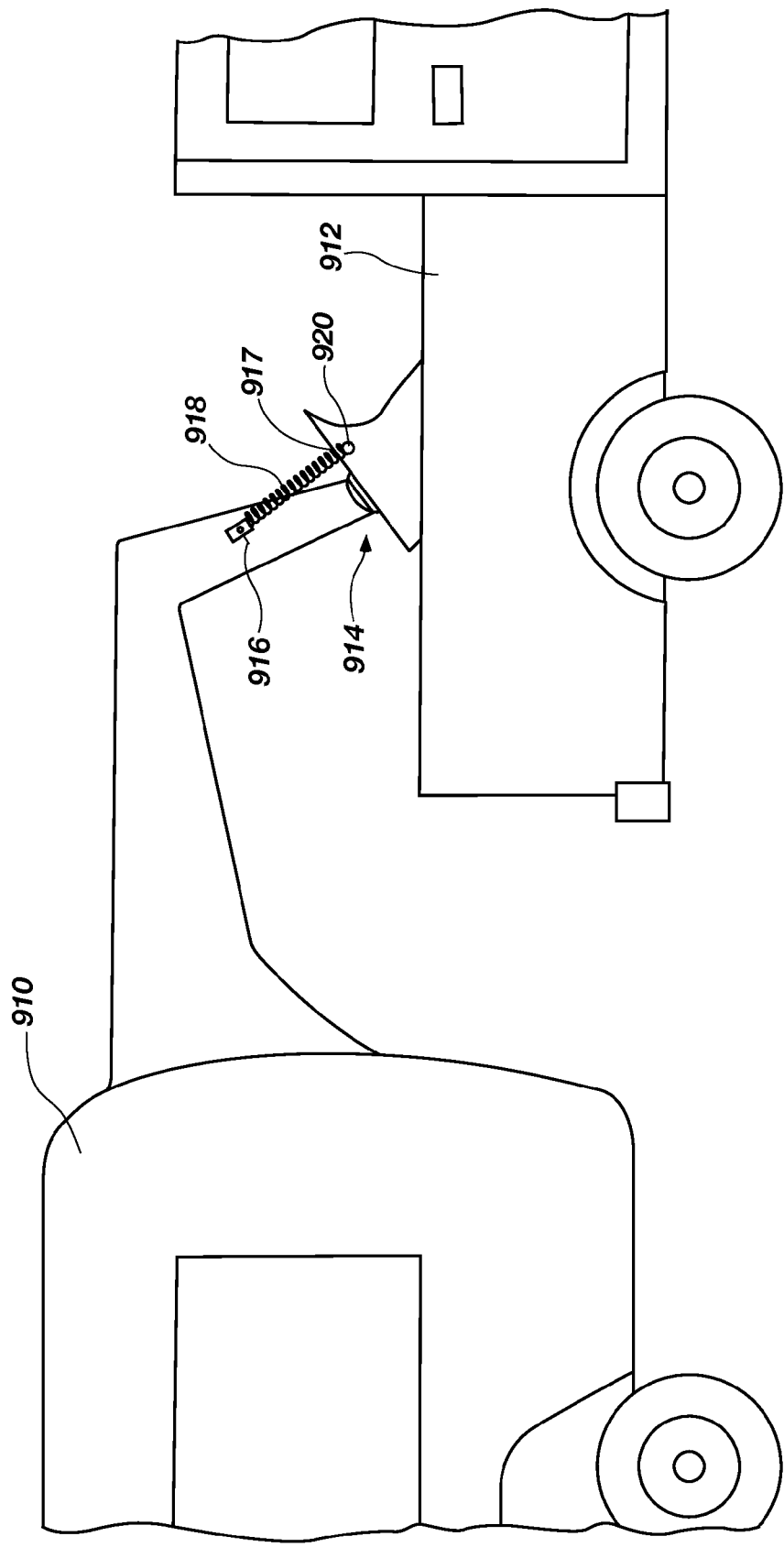
FIG. 16 is illustrative of a biased cable used in conjunction with a goose neck trailer.

FIG. 16 is illustrative of a biased cable 918 used in conjunction with a goose neck trailer 910. The switching mechanism comprises a switch 916, a pin 917, a cable 918 and a tow vehicle attachment 920. A biased coil spring may be formed in the cable 918 and attached to a breakaway switch 916 and tow vehicle 912. It will be appreciated that the cable 918 may not be sagging or near the other components where it can be damaged. The bias configuration of the cable allows tow vehicle 912 and trailer 910 to articulate without activating the brakes or having the cable 918 tangling with other objects in the bed of the tow vehicle 912.

One embodiment is an apparatus or method that may integrate a coil spring into a cable 918 by forming the cable 918 into the shape of a coil spring so it contracts when it has slack and extends when under tension. This will require special forming of the cable 918 and may be accomplished by coating it with plastic, vinyl or rubber so that it may hold the spring shape. Or by replacing the cable with a coil that is strong enough to pull the pin 917 from an electrical contact box or to activate a surge brake lever when extended beyond a limit. Gooseneck and fifth wheel trailers attach in the bed of truck instead of near the rear bumper. The cable 918 may be attached to a bed or hitch of the tow vehicle 912. In a goose neck or fifth wheel application the benefit may be that the spring cables 918 described herein are less likely to catch on cargo in the bed.

In accordance with the features and combinations described above, a useful method of stopping a trailer that has become disconnected from a tow vehicle includes the steps of:

attaching to the trailer a braking system;
attaching to the trailer an actuating member for actuating the braking system; and
connecting a first end of a cable to the actuating member, said cable having a coil spring integrally formed therein for tensioning said cable.

It will be appreciated that the present disclosure is suitable for use with fifth wheel trailers and bumper pull trailers.

It will be appreciated that the structure and apparatus disclosed herein is merely one example of a means for tensioning a cable, and it should be appreciated that any structure, apparatus or system for tensioning a cable which performs functions the same as, or equivalent to, those disclosed herein are intended to fall within the scope of a means for tensioning a cable, including those structures, apparatus or systems for tensioning a cable which are presently known, or which may become available in the future. Anything which functions the same as, or equivalently to, a means for tensioning a cable falls within the scope of this element.

Those having ordinary skill in the relevant art will appreciate the advantages provided by the features of the present disclosure. In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for stopping a trailer that has disconnected from a tow vehicle, said system comprising:
a braking system;
an actuating member for actuating the braking system; and
a cable connected to the actuating member, said cable including a coil spring;
the break system comprises an electric braking system comprising:
one or more brakes disposed on one or more wheels of the trailer, wherein each of the one or more brakes restricts rotation of a wheel of the trailer in response to engaging of the one or more brakes; and
one or more magnets connected to one or more brakes, each of the magnets to actuate a brake in response to application of an electrical current to the magnet;
the actuating member for actuating the breaking system comprises a pin removably connected to a breakaway switch; and
the breakaway switch comprises an electrical connection to the one or more magnets in response to the pin being removed from the breakaway switch, and wherein the electrical connection is broken in response to the pin being connected to the breakaway switch.

2. The system of claim 1, wherein the cable has an overall length of between three and seven feet.

3. The system of claim 2, wherein the cable has overall length of approximately four feet.

4. The system of claim 3, wherein the coil spring comprises eighteen coils.

5. The system of claim 2, wherein the cable has overall length of approximately six feet.

6. The system of claim 5, wherein the coil spring comprises twenty seven coils.

7. The system of claim 1, wherein said cable comprises at least one strand of wire encased in a sheath.

8. The system of claim 7, wherein said sheath comprises one of plastic, rubber and vinyl.

9. The system of claim 1, further comprising a tow vehicle attachment member attached to an end of the cable.

10. The system of claim 1, wherein the trailer is one of a fifth wheel and a bumper pull trailer.

11. The system of claim 1, wherein the coil spring comprises an outer diameter between 0.85 inches and 1.25 inches.

12. The system of claim 1, wherein the coil spring comprises an outer diameter of approximately 0.9 inches.

13. The system of claim 1, wherein the coil spring comprises an inner diameter between 0.7 inches and 1.1 inches.

14. The system of claim 1, wherein the coil spring comprises an inner diameter of approximately 0.75 inches.

15. The system of claim 1, wherein the coil spring comprises between fifteen and thirty coils.

16. The system of claim 1, wherein the coil spring, in an unbiased state, comprises a plurality of coils at a frequency of approximately ten coils per inch.

17. The system of claim 1, wherein the coil spring comprises a majority length of the cable.

18. The system of claim 1, wherein:
the cable connected to the actuating member further comprises:
    at least one strand of wire;
    a sheath encasing the at least one strand of wire, wherein:
        the sheath comprises a plastic formed into a coil spring shape to cause a majority length of the cable to be coiled;
        the coil spring shape produces a tension proportional to a distance between a first end of the cable and the second end of the cable;
        the tension is zero when the coil spring shape is in an unbiased state;
        the coil spring shape has an outer diameter of approximately 0.9 inches;
        the coil spring shape has an inner diameter of approximately 0.75 inches; and
        the coil spring shape comprises a plurality of coils at a frequency of approximately ten coils per inch; and
    a tow vehicle attachment member comprising a hook pivotally attached to the cable.

* * * * *